Patented Mar. 9, 1943

2,313,092

UNITED STATES PATENT OFFICE 2,313,092

METHOD FOR DECOMPOSING ORGANIC MATERIALS

Francis Owen Rice, Baltimore, Md., assignor, by mesne assignments, to Process Management Company, Inc., Wilmington, Del., a corporation of Delaware No Drawing. Application July 28, 1938,
Serial No. 221,717

10 Claims. (Cl. 196—50)

This invention relates to chemical processes for converting organic materials of higher molecular weight into material of lower molecular weight and in particular to processes wherein organic material is converted by the aid of a promoter to organic material of lower molecular weight.

In carrying out the decomposition of organic materials such as the cracking of hydrocarbons and the like, or the decomposition of organic acids, aldehydes, ketones, ethers, esters, and the like, sulphur compounds, nitrogen compounds, halogen derivatives and the like, it is generally necessary to employ drastic conditions. As the decomposition reactions just above mentioned are time-temperature reactions, it is often necessary to employ very high reaction temperatures or long reaction times. It is often impossible to carry out the decomposition of certain organic materials without accompanying side reactions that result in unwanted products. Furthermore, certain organic materials cannot, because of the high temperatures required, be decomposed economically.

It is an object of this invention to provide a process for effecting the decomposition of organic material under less drastic temperature conditions than heretofore required.

It is also an object of this invention to provide a process for effecting the decomposition of organic material in which the ultimate yield of desired products is made greater than heretofore by suppressing the effect of the side reactions.

It is a further object of the invention to provide a process for effecting the decomposition of organic material in which the yield of the desired products resulting from a single passage of the organic material through the reaction zone is greater than heretofore under comparable conditions, and the yield of intermediate products which require further processing is less.

In accordance with the invention, organic starting material, which may be a single organic compound or a mixture of organic compounds, which it is desired to decompose, is passed to a reaction zone. An organic material to serve as the reaction promoter, is also passed to the reaction zone, either by mixing it with the starting material prior to the introduction of the starting material into the reaction zone, or by separately introducing the source material into the reaction zone. The mixture thus formed is subjected to conditions that favor the carrying forward of the desired decomposition reaction. When the desired decomposition is completed, the mixture is removed from the reaction zone and the desired products separated.

All of the compounds mentioned above will decompose of themselves if the temperature is high enough. However, in accordance with one aspect of my invention I initiate these decompositions at temperatures below that at which the starting material will of itself decompose. In accordance with a further aspect of the invention I carry on these decompositions at temperatures under which the starting material will decompose by itself at a relatively low rate and I increase the rate of decomposition. The general principle of classical reaction kinetics, that when two or more reactions proceed simultaneously each may be treated independently of the others and regarded as if it were decomposing alone, is not true for the organic decompositions which we are considering. If two organic materials are decomposing in the presence of one another the one will influence the rate of decomposition of the other and vice-versa. Generally, therefore, the compound which decomposes easier will promote the decomposition of the other.

It is necessary to introduce into the system only a small amount of promoter. This material must of course be of such a nature that it will decompose at a lower temperature or at a higher rate than that of the starting material.

While numerous substances may be used as promoters, in general, the promoter may be any organic compound more easily decomposed than the original substrate. However certain principles must be followed in the use of promoters:

(1) Under the conditions of the decomposition, the stability of the added compound must be such that it decomposes slowly.

(2) The temperature must be relatively high especially when substrates containing one or more double bonds are acted on.

There is a wide diversity of conditions under which the various promoter materials decompose. This makes it possible to select reaction conditions and promoter material best suited to the desired reaction. However, for the decomposition of hydrocarbons, and other organic materials such as acetone, certain promoters are particularly useful. These include tetramethyl methane, butylene, diallyl, dibenzyl, ethylbenzene, 1-3 di-ketones such as acetonyl-acetone, alkylene oxides, cyclo-hexane, cyclo-octane, dipentene, pinene, and the various polymers of iso-prene.

The decomposition of the materials used as promoters may be effected by various agencies. For instance, the promoter material may be subjected to pyrolytic decomposition by the application of heat, or it may be decomposed by subjecting it to electrical decomposition, or it may be decomposed by the photo-chemical action of light. Also, the promoter material may be decomposed by a combination of any of the agencies just mentioned.

When heat is used to effect the decomposition of the promoter material, the promoter material chosen should be such that it will decompose at a lower temperature or a higher rate than the starting material.

The decomposition of the promoter material by heat may in some cases be inexpedient either because of the character of the promoter material, the character of the starting material, or the character of the final product. In such cases, the promoter material may be decomposed by subjecting it to electric discharge. Photo-chemical means may also be employed to effect the decomposition of the promoter material. The decomposition is carried out through the action of light of the proper wave length on sensitized material. Photo-chemical methods may be employed to effect the decomposition of the promoter material by (1) choosing a promoter which readily absorbs a convenient wave length, or (2) using a photo-sensitizer which will absorb the light and pass the resultant energy on to the otherwise insensitive promoter material.

In the foregoing I have described in general terms the manner of carrying my invention into practice. For a better understanding of the invention in its more specific aspects I will now describe it in connection with the decomposition of several typical materials:

*Pyrolysis of gas oil*

I find that ethylene oxide is advantageous as a promoter for the pyrolytic conversion of gas oil for the production of motor fuel and that by its use the pyrolysis of gas oil may be carried out under less drastic conditions than heretofore, or, if the conditions of the prior practice are used, the conversion rate may be materially increased without increasing the polymerization and gas producing reactions in the same proportions. In the present practice gas oil is cracked at temperatures ranging from 450° C.–600° C. under pressures up to 1000 pounds per square inch or higher. I obtain the same results by the use of ethylene oxide as a promoter at temperatures ranging around 400° C., and at temperatures within the range of the present practice I am able to obtain materially greater cracking rates than at present obtained.

In converting a gas oil, as for instance a Mid-Continent gas oil having a gravity of 35° A. P. I., the gas oil is mixed with ethylene oxide below conversion temperature and the mixture is quickly raised to a conversion temperature by being passed through a heating zone wherein it is heated to an outlet temperature of about 400° C. 1 mol. per cent, more or less, of ethylene oxide based on the total feed to the heating zone is added to the gas oil. When using alkylene oxides such as ethylene oxide as a promoter for the decomposition of hydrocarbons, it is important to mix the alkylene oxide with the hydrocarbon while it is relatively cool or while it is below the conversion temperature for the hydrocarbon and below the temperature at which any reaction takes place between the hydrocarbon and promoter. It is also important to obtain a good distribution of the ethylene oxide in the hydrocarbon by thorough mixing and diffusion before heating the mixture to a reaction temperature. After the promoter is mixed with the hydrocarbon, the mixture is quickly heated to reaction temperature. While the heating zone may also be the reaction zone I prefer to employ a separate reaction zone.

The gas oil after it attains the reaction temperature, passes into a reaction zone wherein it is held for a sufficient length of time to carry out the desired conversion. Secondary decomposition of the lighter hydrocarbons produced to still lighter hydrocarbons of lower boiling point than the desired final product is reduced due to the low temperature under which the decomposition takes place. Likewise the formation of polymerized products heavier than the original starting material is reduced.

The decomposed material is removed from the reaction zone and separated into gas, gasoline, recycle stock, and tar by the usual methods of fractionation. The recycle stock, i. e., the fraction boiling within the limits of the original gas oil, is returned to the heating zone and united with the fresh gas oil for further processing. While a recycle operation has been described it is to be understood that the invention applies equally well to once-through operations.

While my invention is not limited to vapor phase decompositions, I at present prefer to carry on the decomposition of gas oil under pressure conditions which assure the decomposition reactions taking place in the vapor phase. Thus the heating zone and the reaction zone, when a separate reaction zone is used, are maintained at a pressure in the neighborhood of 50 pounds per square inch, though pressures ranging from atmospheric to about 70 pounds per square inch may be used with the gas oil and decomposition temperature designated.

The decomposition of the gas oil mentioned may also be carried out under the temperature and pressure ranges of the present practice, in which case the reaction rate is materially increased over that obtainable in accordance with the present practice. Because of this, a higher conversion per pass may be obtained without a proportionate increase in gas or tar formation. Thus I am able by my novel method to carry out the pyrolysis of gas oil with a greater yield of gasoline than is possible with the methods of the present practice both on a "once through" and on an "ultimate" basis.

In another example, a gas oil of about 0.85 specific gravity and boiling between about 260° C. and about 400° C. was vaporized and passed through a quartz tube having an inside diameter of about 6 mm. The quartz tube was heated to about 510° C. and a yield of about 5% of lower boiling hydrocarbons within the gasoline boiling range was obtained. During passage through the quartz tube, the gas oil vapors were maintained substantially at atmospheric pressure.

Under the above conditions, when ethylene oxide in amount equal to about 1.5% by weight of the gas oil is added to the gas oil prior to its passage through the quartz tube, a yield of over 20% of lower boiling hydrocarbons within the gasoline boiling range was obtained. In this example it will be seen that the rate of conversion of the gas oil was increased four-fold. As in the previous example, best results are obtained when the ethylene oxide and gas oil are thoroughly mixed below reaction temperature before being introduced into the heating zone and the mixture then raised quickly to conversion temperature.

The alkylene oxide promoters are used in relatively small amounts. For example, in the decomposition of hydrocarbons, about 0.2% to about 2% by weight of ethylene oxide on the total feed is used.

Instead of ethylene oxide, other alkylene oxides such as propylene oxide, or substituted alkylene oxides may be used.

Decomposition of acetone

The pyrolytic decomposition of acetone with the production of ketene and methane begins at around 500° C. and is usually carried out at about 600-700° C. Since ketene is unstable at these temperatures a substantial loss of ketene by decomposition is suffered. I find that by the use of a suitable promoter I am able to carry out the decomposition of acetone at temperatures substantially lower than those ordinarily used in practice with little loss of ketene.

In the decomposition of acetone into ketene by the use of promoters it is important to conduct the decomposition in a temperature range sufficiently high such that the reaction of the decomposition products of the promoter with the double bond is suppressed. For example, when acetone at about 350° C. is treated with materials such as lead tetramethyl, mercury diethyl, ethylene oxide and the like, there results not ketene but higher molecular weight compounds formed by reaction of the decomposition products of said materials with the double bond of the carbonyl group. Furthermore, even if acetone containing a few percent of lead tetramethyl or mercury diethyl or ethylene oxide is decomposed in the ordinary range of the acetone decomposition, the velocity of the decomposition is not greatly augmented over that of pure acetone because the said materials are exceedingly unstable in this high range of temperature and decompose practically instantaneously on reaching the hot zone.

However, I find that I am able to carry out the decomposition of acetone at a temperature of around 500° C. with little loss of ketene. Tetramethyl methane or other hydrocarbon of relatively high molecular weight is a suitable promoter material for this decomposition reaction. From 1.0 mol. per cent to 4.0 mol. per cent of tetramethyl methane is sufficient to initiate the decomposition reaction and assure its going forward at a suitable rate.

The acetone is heated to around 500° C. by passing it through a heating coil. When the reaction temperature is reached the tetramethyl methane is injected into the stream of acetone vapor to rapidly heat the tetramethyl methane and effect its decomposition. The acetone and tetramethyl methane are then passed through an elongated reaction zone wherein the decomposition of the acetone takes place. I prefer to use an elongated reaction zone for the reason that by the use of such a zone the average concentration of ketene throughout the zone is lessened and thereby the possibility of its decomposition is likewise lessened.

The length of the reaction zone is made such that from 25% to 40% of the acetone is decomposed in its passage therethrough. More than 40% decomposition results in the excessive decomposition of ketene due to its increased concentration in the reaction zone.

The decomposition reaction may be carried out at atmospheric or even at reduced pressures. However, since all of the materials and products are highly volatile and there can be no side polymerization reactions, I prefer to carry it out under superatmospheric pressure, for by so doing I can materially increase the capacity of the apparatus. Pressures as high as 500 pounds may be used with satisfactory results as all the material and products are in the vapor phase at this pressure.

The main reaction products, i. e., methane, ketene and undecomposed acetone, are passed from the reaction zone to a separation zone. In the separation zone reaction products are separated as for instance by condensation and fractionation, into substantially pure constituents. The methane and the ketene are removed from the system and the undecomposed acetone is recirculated to the heating zone for further decomposition.

While the main reaction products are those indicated, there will be small amounts of other products such as olefins and ethane or methyl ethyl ketone.

The conditions of the decomposition reaction given above are favorable for the efficient production of ketene. However, if it is desired to increase the rate of decomposition of the acetone, the decomposition temperature may be increased even to the range used in the prior practice. At the decomposition temperatures of the prior practice, the rate of the decomposition of the acetone is greater in the order of ten times than the rate obtained in the prior practice. Also, as the time element is materially less, the decomposition of ketene is less than in the prior practice resulting in smaller loss of ketene.

I have disclosed my invention in considerable detail both as to its mode of operation and as to specific examples of its use. This disclosure is sufficient to permit any skilled worker of the art to carry out the decomposition of any particular substance falling within the class of materials to which the invention relates. While I have disclosed specific examples, it is to be particularly understood, that the examples are given merely as illustrations and are not to be taken as in any way limiting the invention defined in the appended claims.

This application is a continuation-in-part of my prior application Serial No. 40,263, filed September 12, 1935.

I claim:

1. A process for converting hydrocarbons higher boiling than gasoline to hydrocarbons boiling within the gasoline boiling range which comprises admixing said higher boiling hydrocarbons with an alkylene oxide at a temperature sufficiently low to avoid decomposition of said alkylene oxide in proportions such that the resulting mixture contains 0.2 to 2 per cent by weight of alkylene oxide, and heating the resulting mixture in the absence of added hydrogen to a temperature sufficiently high to effect substantial decomposition of said alkylene oxide to promote decomposition of said higher boiling hydrocarbons to gasoline constituents.

2. The process of claim 1 wherein said alkylene oxide consists essentially of ethylene oxide.

3. The process of claim 1 wherein the mixture of hydrocarbons and alkylene oxide is heated to the decomposition temperature in the absence of a catalyst mass.

4. The process of claim 1 wherein the mixture of higher boiling hydrocarbons and alkylene oxide is heated to a temperature sufficiently high to effect decomposition of said hydrocarbons to a small degree in the absence of said alkylene oxide whereby substantial decomposition of said hydrocarbons is effected by reason of the presence of said alkylene oxide in the mixture.

5. The process of claim 1 wherein the mixture of hydrocarbons and alkylene oxide is heated to a temperature not greater than 450° C. but sufficiently high to effect substantial decomposition of the said alkylene oxide.

6. A process for the conversion of hydrocarbons higher boiling than gasoline to hydrocarbons boiling within the gasoline range which comprises admixing said higher boiling hydrocarbons with an alkylene oxide in proportions such that the resulting mixture contains only a minor amount of alkylene oxide and maintaining the mixture at a relatively low reaction temperature such that at said temperature a small degree of conversion would take place in the absence of the alkylene oxide but substantial conversion of said hydrocarbons is effected by reason of the presence of said alkylene oxide in the mixture.

7. A process for the conversion of hydrocarbons higher boiling than gasoline to hydrocarbons boiling within the gasoline range which comprises admixing said higher boiling hydrocarbons with an alkylene oxide in proportions such that the resulting mixture contains only a minor amount of alkylene oxide and maintaining the mixture at a relatively low reaction temperature such that at said temperature a small degree of conversion at most would take place in the absence of the alkylene oxide but substantial conversion of said hydrocarbons is effected by reason of the presence of said alkylene oxide in the mixture.

8. A process for the conversion of hydrocarbons higher boiling than gasoline to hydrocarbons boiling within the gasoline range which comprises admixing said higher boiling hydrocarbons with an alkylene oxide in proportions such that the resulting mixture contains 0.2 to 2 per cent by weight of alkylene oxide and maintaining the mixture at a relatively low reaction temperature, such that at said temperature a small degree of conversion at most would take place in the absence of the alkylene oxide but substantial conversion of said hydrocarbons is effected by reason of the presense of said alkylene oxide in the mixture.

9. A process for the conversion of hydrocarbons higher boiling than gasoline to hydrocarbons boiling within the gasoline range which comprises admixing said higher boiling hydrocarbons with an alkylene oxide, at a temperature sufficiently low to avoid decomposition of said alkylene oxide, in proportions such that the resulting mixture contains only a minor amount of alkylene oxide and heating the resulting mixture to a temperature at which a small degree of conversion at most of said hydrocarbons would take place in the absence of the alkylene oxide and at which substantial decomposition of said alkylene oxide occurs to promote substantial conversion of said hydrocarbons.

10. A process for the conversion of hydrocarbons higher boiling than gasoline to hydrocarbons boiling within the gasoline range which comprises admixing said higher boiling hydrocarbons with ethylene oxide in proportions such that the resulting mixture contains only a minor amount of ethylene oxide and maintaining the mixture at a relatively low temperature such that a small degree of conversion at most would take place in the absence of ethylene oxide but substantial conversion of the hydrocarbons is effected by reason of the presence of said ethylene oxide in the mixture.

FRANCIS OWEN RICE.